(12) United States Patent
Kasahara

(10) Patent No.: US 7,293,881 B2
(45) Date of Patent: Nov. 13, 2007

(54) VIDEO PROJECTOR FOR DOME SCREEN

(75) Inventor: Makoto Kasahara, Fuchu (JP)

(73) Assignee: Kabushikigaisya Goto Kogaku Kenkyujyo, Tokyo (JP)

( * ) Notice: Subject to any disclaimer, the term of this patent is extended or adjusted under 35 U.S.C. 154(b) by 269 days.

(21) Appl. No.: 11/114,266

(22) Filed: Apr. 26, 2005

(65) Prior Publication Data

US 2006/0139579 A1  Jun. 29, 2006

(30) Foreign Application Priority Data

Dec. 28, 2004  (JP) ............................. 2004-382019

(51) Int. Cl.
- G03B 21/26  (2006.01)
- G03B 21/20  (2006.01)
- G09G 5/00   (2006.01)
- H04N 7/00   (2006.01)
- H04N 3/22   (2006.01)

(52) U.S. Cl. .................. 353/94; 353/122; 345/1.1; 348/36; 348/48; 348/745; 348/806

(58) Field of Classification Search ................ 353/101, 353/122, 30, 79, 94; 348/745, 806, 36, 48; 345/207, 1.1; 52/6, 7, 64, 65, 66
See application file for complete search history.

(56) References Cited

U.S. PATENT DOCUMENTS 5,803,570 A * 9/1998 Chen et al. .................. 353/122
6,253,494 B1 * 7/2001 Shaffron ............................ 52/7

* cited by examiner

Primary Examiner—Melissa Jan Koval
(74) Attorney, Agent, or Firm—Lackenbach Siegel, LLP

(57) ABSTRACT

A video projector projects an image without reducing the resolution, onto the full dome surface by the use of a single-eye fisheye lens. The video projector has a single-eye fisheye lens for projecting a beam of light from an image display device onto the dome surface, a plurality of image display devices jointly uses the fisheye lens. The beams of light from the respective image display devices are combined and sent to the fisheye lens. Projected regions of images displayed on the respective image display devices correspond to certain sections of the dome surface. The projection image extends throughout the full dome surface.

5 Claims, 4 Drawing Sheets

VIDEO PROJECTOR FOR DOME SCREEN

BACKGROUND OF THE INVENTION

This application claims priority and incorporates by reference Japanese Patent Application 2004-382019, dated Dec. 28, 2004.

FIELD OF THE INVENTION

This invention relates to a video projector for a dome screen used in a planetarium or any other facility in which an image is projected onto a spherical screen, for example.

DESCRIPTION OF THE RELATED ART

Some known video projectors project an image from an image display device, such as a liquid crystal panel or a digital micromirror device (DMD), onto a screen through an optical system. These video projectors, which take the place of conventional projectors, are used for a dome screen provided in a planetarium or any other facility in which an image is projected on to a spherical screen, for example.

As compared with projection onto ordinary screens, a wide angle of view is required for projection onto a dome screen. Therefore, the following two projecting methods have been conventionally employed.

One of them is a method of combining a plurality of divided images into a single image projected onto the full range of the dome surface. In this case, the various images are respectively projected from a plurality of video projectors onto the corresponding sections of the dome surface. The images projected onto the respective sections are combined to form a continuous single image on the full dome surface.

The other method is to use a single video projector with a fish eye lens to project a single image onto the full dome surface.

These methods are disclosed in Japanese unexamined patent publication 9-149351, Japanese unexamined patent publication 2001-309275, for example.

FIG. 6 is a diagram of an example of the structure of the first of the above-mentioned methods in the related art, in which the projection image is divided by two projectors. FIG. 6 shows the video projectors P1 and P2, and the video projector P1 is situated in a position to project a projection image A1 onto the right half of the dome surface located opposite the video projector P1. Likewise, the video projector P2 is situated in a position to project a projection image A2 onto the left half of the dome surface located opposite the video projector P2. The projection image A1 and the projection image A2 are combined to create a projected image continuously extending throughout the dome surface. In order to seamlessly match up the divided images independently projected, an edge blend area B is provided for projecting the overlapping parts of the two divided images centered on the image dividing line C.

In this case, distortion occurs when the images are projected onto the dome surface, and makes it impossible to combine the individual images together to create a single image. Therefore, for example, the images to be projected from the respective video projectors are deformed as a corrective for the purpose of projecting the image with less distortion, or the processing of blurring the edge blend area is performed to make a seamless connection. However, the video projectors are installed separately in the facility and are not always situated in an ideal location. Further, from the viewpoint of the precise adjustment of the projecting positions between the projectors and the accuracy of the dome surface itself, it is extremely difficult to perform on site the distortion correction and/or the processing of blurring the edge blend area. Of necessity the errors introduced in the projectors must be averaged, thereby giving rise to the problem of degradation in quality of the projected image.

On the other hand, the second of the aforementioned two methods in the related art uses a single-eye projection lens for projection onto the full range of the dome surface. Hence, at least the above problem is eliminated. However, the image from the single image display device is projected with an ultra-wide angle of view. When the image display device has standard resolution, the resolution of the image projected is decreased. This decrease may possibly detract from the concentration of viewer on the projected image which should ideally be offered by the projected image with an ultra-wide angle of view. For this reason, an image display device with high resolution is required, and in turn the necessary video projector is expensive. Further, in this case, because of the projection onto the full range of the dome surface, a circular-shaped region of an image G1 displayed on the rectangular image display device G is used as shown in FIG. 4. What remains over is an unused region G2 occupying a large area of the image display device, resulting in inefficiency.

SUMMARY OF THE INVENTION

It is an object of the present invention to provide a video projector for a dome screen successfully achieving a solution to the problems associated with the related art as described above. In a feature of the present invention, the video projector for a dome screen has a plurality of image display devices, a single-eye projection lens used jointly by the plurality of image display devices and provided for projecting beams of light from the image display devices onto the dome screen, and means for combining the beams of light from the image display devices and sending the combination to the projection lens. A projection region of an image displayed on each of the image display devices corresponds to each section of the dome screen, and the projection regions to be projected onto the respective sections are combined to in the video projector create a projection image continuing throughout the full dome screen.

According to the present invention, the projection region of the image displayed on each of the image display devices falls just right within a section of the dome surface, so that the angle of view is not widened and therefore the resolution of the image projected onto the dome surface is not reduced. In consequence, even when an image display device with standard resolution is used, it is possible to project an image with a satisfactory degree of resolution.

Further, although a continuous image projected onto the full range of the dome surface is obtained by combining the images to be projected onto the corresponding sections of the dome surface, the distortion correction and/or the processing for the edge blend area between the images from the image display devices are not performed on site, but are completed inside the video projector. This makes it possible to facilitate implementing adjustments with a significantly high accuracy.

These and other objects and features of the present invention will become more apparent from the following detailed description with reference to the accompanying drawings.

DETAILED DESCRIPTION OF THE PREFERRED EMBODIMENTS

Figure 1:
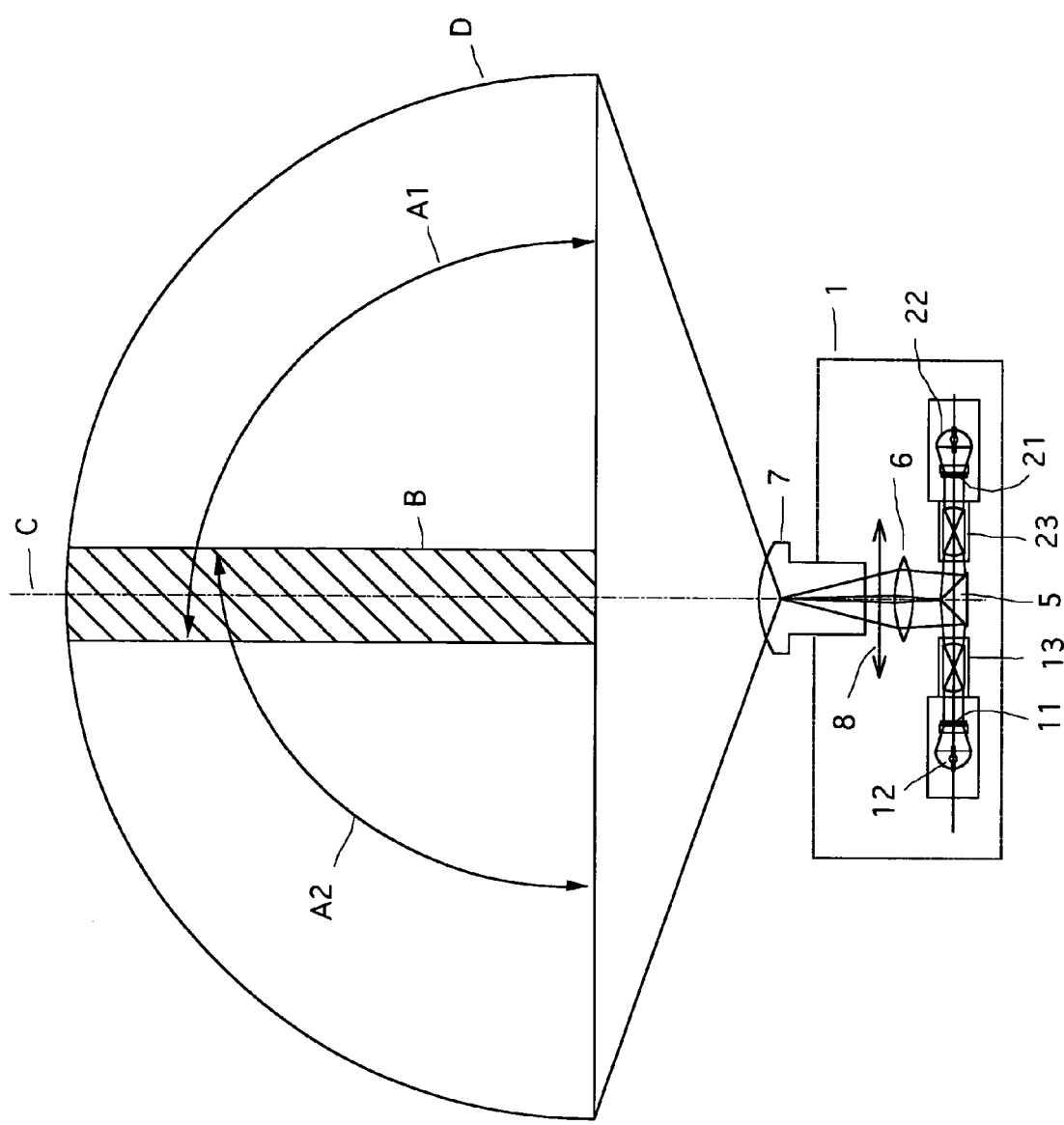
FIG. 1 is a schematic block diagram of an embodiment of a video projector according to the present invention.
Figure 2:
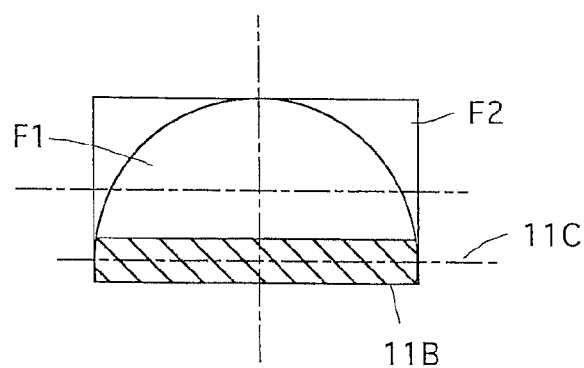
FIG. 2 is a plan view of an image display device in the embodiment.
Figure 3:
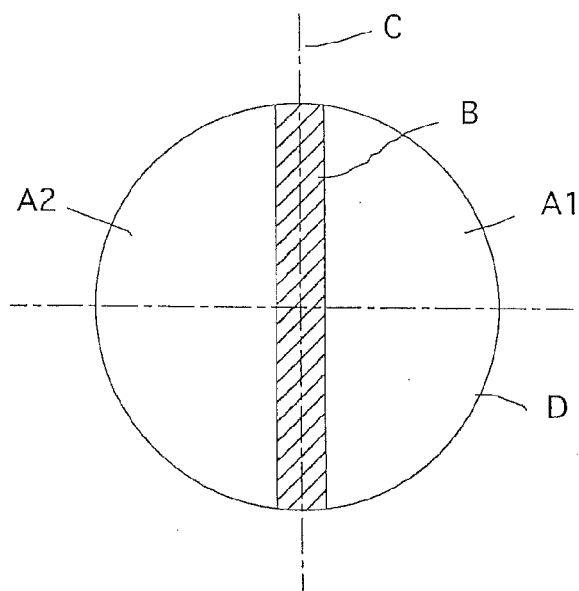
FIG. 3 is a diagram illustrating a combined and formed image.

FIGS. 1 to 3 are diagrams illustrating an example of the structure of a video projector according to an embodiment of the present invention. In this example, two divided projection images are combined to create a continuous projection image on the full range of the dome surface. Needless to say, the number of divided images is not limited to two. A video projector 1 in FIG. 1 has a single-eye projection lens 7 for projecting a beam of light from an image display device onto the dome surface D, two image display devices 11 and 21 jointly using the projection lens 7, and means for combining beams of light from the respective image display devices 11 and 21 and sending the combination to the projection lens 7. The image display device used in the embodiment is of a transmission type, but it goes without saying that a reflection-type image display device can be used.

In the embodiment, a synthetic prism 5 is used as the means for combining the beams of light from the respective image display devices 11 and 21 and sending the combination to the projection lens 7. The image display devices 11 and 21 are located on the right and left sides of a synthetic prism 5 and irradiated by light sources 12 and 22, respectively. The beams of light pass through relay lenses 13 and 23 and are combined by the synthetic prism 5. The combined beam of light travels through a reducing lens 6 and enters the projection lens 7 constituted of a fisheye lens. Thereby, a projection image A1 from the image display device 11 is projected onto the right half of the dome surface. Likewise, a projection image A2 from the image display device 21 is projected onto the left half of the dome surface. The prior combination of the projection image A1 and the projection image A2 provides a projected image continuing throughout the dome surface. At this point, an edge blend area B is provided for projecting the overlapping parts of the two divided images centered on the image dividing line C in order to seamlessly match up the divided projection images. Reference numeral 8 in FIG. 1 denotes a plane in which the combined image from the image display devices 11 and 21 is formed within the above-mentioned optical system. FIG. 3 shows a diagram of the combined image so formed.

Figure 4:
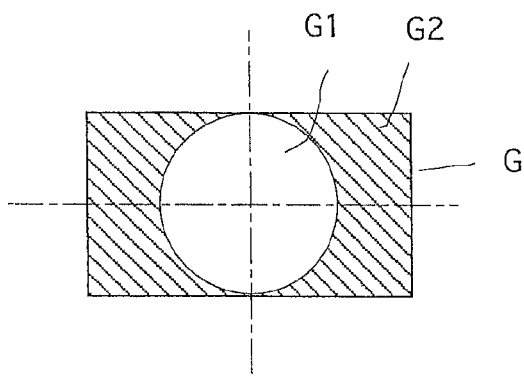
FIG. 4 is a plan view of an image display device in the related art.

FIG. 2 is a diagram of the image displayed by the image display device 11, in which reference symbol F1 denotes the displayed image, 11C denotes the line dividing the image from the other image displayed by the image display device 21, and 11B denotes the edge blend area. As is clear from FIG. 2, in the present invention, the unused region F2 forms a decreased proportion of the display area of the image display device 11. Further, as compared with the related art which uses a single video projector having a fisheye lens to project the image displayed by a single image display device onto the full range of the dome surface (see FIG. 4), an improvement in the rate of utilization of the image display device can be seen. Note that the embodiment uses two image display devices with 1024×768 pixels to project a 1024×768 pixel image.

Figure 5:
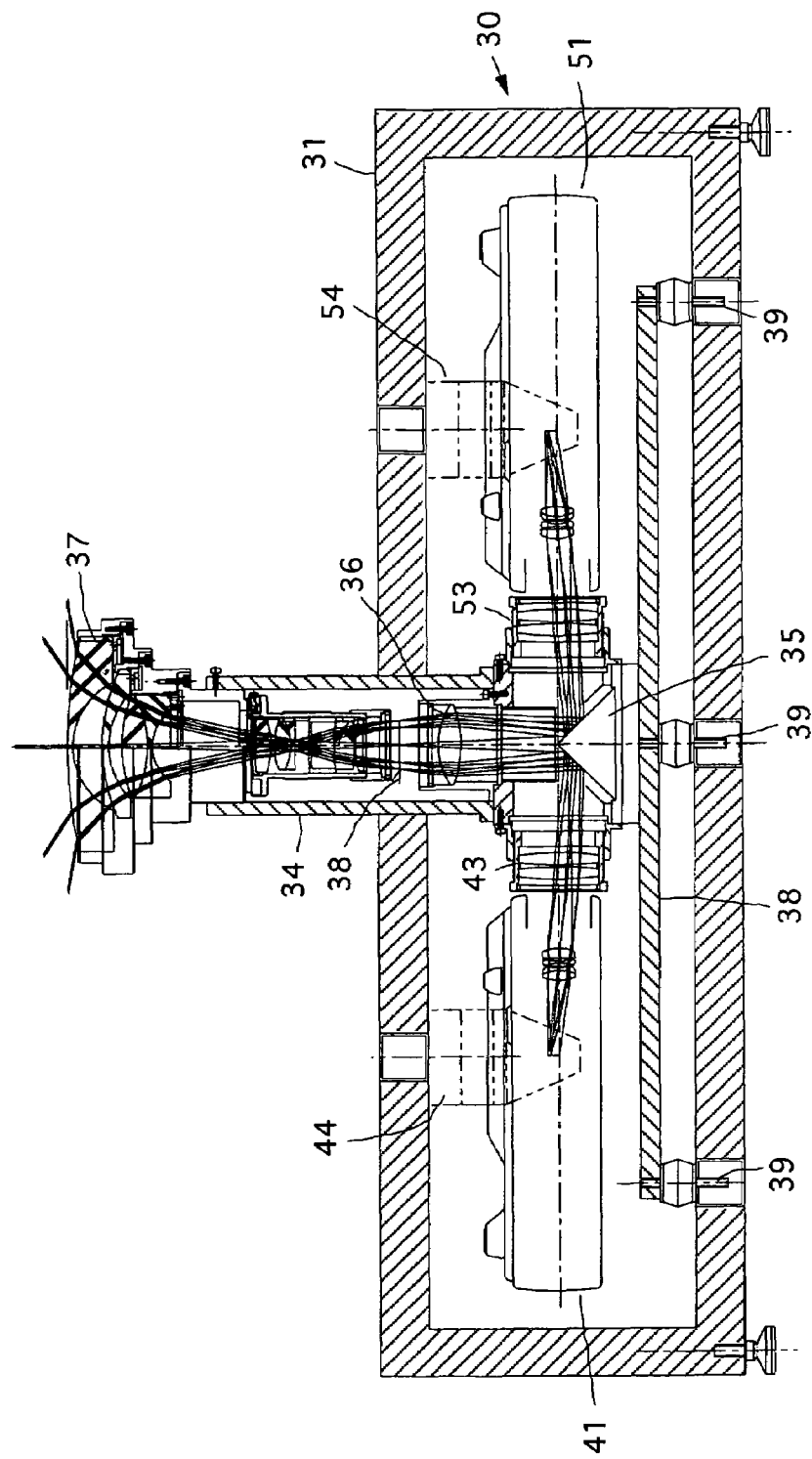
FIG. 5 is a partially sectional front view of another embodiment of a video projector according to the present invention.
Figure 6:
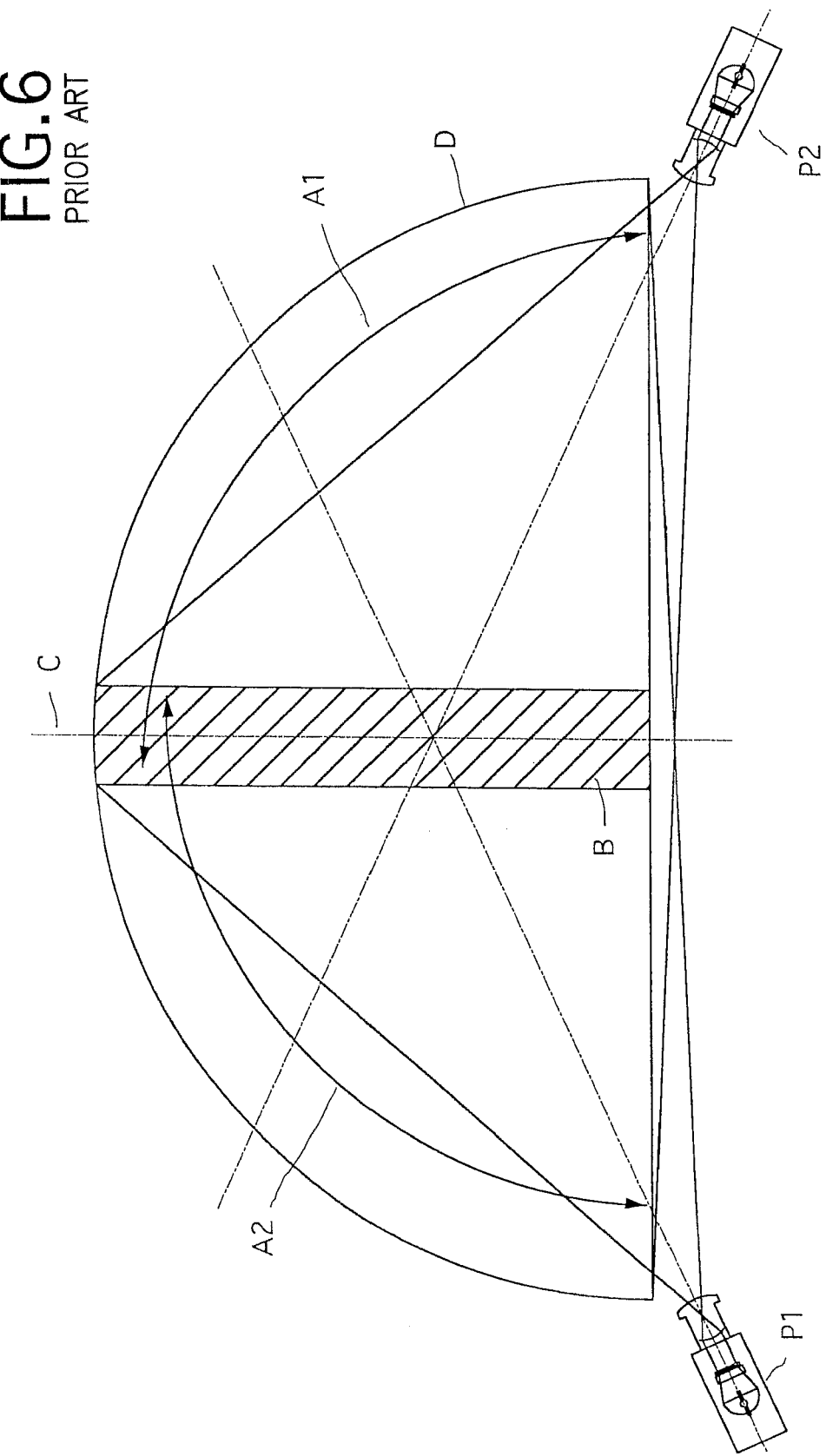
FIG. 6 is a schematic block diagram illustrating a method for video projection in the related art.

Next, FIG. 5 illustrates another concrete embodiment of the video projector according to the present invention. This embodiment gives the example of adapting already-existing video projectors to create the video projector according to the present invention, for combining together the two divided projection images and projecting them as a continuous projection image onto the full region of the dome surface. FIG. 5 shows a housing 31 of the video projector 30 of the present invention. Video projecting units 41 and 51 are placed in the housing 31 in positions with their image-projecting ends aimed at each other. A projector lens barrel 34 is inserted into the housing 31 in the vertical direction of the housing. The video projecting units 41 and 51 used here are any already-existing video projector, such as a liquid crystal projector or Digital Light Processing Projector ("Digital Light Processing" is a trademark of Texas Instruments Incorporated), having an optical system including a light source and an image display device. The beams of light from the video projecting units 41 and 51 pass through the relay lenses 43 and 53 and are combined by the synthetic prism 35. The combined beam of light travels through a reducing lens 38 into a projection lens system 37 constituted of a fisheye lens and is then projected. Reference numeral 38 in FIG. 5 denotes a plane in which the combined image from the image display devices of the respective video projecting units 41 and 51 is formed within the optical system.

In the above video projector 30, the video projecting units 41 and 51 respectively have optical-axis adjustment components 44 and 54. The projector lens barrel 34, which houses the synthetic prism 35, the reducing lens 36 and the projection lens system 37, is supported on a mounting base plate that is mounted for adjustment in height and inclination with respect to the housing 31 with adjustment screws 39. In consequence, these adjustments by the optical-axis adjustment components 44 and 54 and the adjustment screws 39 make it possible to facilitate making the adjustment at the point of the combination of the images to be projected.

The terms and description used herein are set forth by way of illustration only and are not meant as limitations. Those skilled in the art will recognize that numerous variations are possible within the spirit and scope of the invention as defined in the following claims.

What is claimed is:

1. A video projector for a dome screen comprising:
    a plurality of image display devices;
    a single-eye projection lens that are used jointly by the plurality of image display devices and provided for projecting beams of light from the image display devices onto the dome screen; and
    means for combining the beams of light from the plurality of image display devices and sending the combination to the projection lens,
    wherein a projection region of an image displayed on each of the image display devices corresponds to each section of the dome screen, and the projection regions to be projected onto the respective sections are combined to in the video projector create a projection image continuing throughout the full dome screen further comprising:
    a projector lens barrel including a synthetic prism and a projection lens;

a plurality of video projection units each provided with a component adjusting an optical axis and each of the image display devices, and each having an image-projecting end aimed at the synthetic prism; and a housing accommodating the projector lens barrel and the plurality of video projection units, wherein the synthetic prism combines beams of light from the image display devices of the respective video projection units to cause the combination to travel into the projection lens.

2. A video projector for a dome screen according to claim 1, wherein the projector lens barrel including the synthetic prism and the projection lens, which is installed in the housing, is capable of being adjusted in height and inclination with respect to the housing.

3. A video projector for a dome screen, comprising:

a projector lens barrel including a synthetic prism and a single-eye projection lens disposed in a housing of the video projector;

a plurality of video projection units disposed in the housing, and respectively provided with components for adjusting an optical axis and image display devices, and each video projection unit having an image-projecting end aimed at the synthetic prism; and means for using the synthetic prism to combine beams of light respectively traveling from the image display devices of the respective video projection units to create an image, and then sending the combined image to the projection lens;

wherein a projection region of an image displayed on each of the image display devices corresponds to each section of the dome screen, and the projection regions to be projected onto the respective sections are combined in the video projector to create a projected image continuing throughout the full dome screen.

4. A video projector for a dome screen, comprising:

a projector lens barrel comprising a synthetic prism and a single-eye projection lens, and disposed in a housing of the video projector;

a plurality of video projection units disposed in the housing, and each respective video projection unit comprises components for adjusting an optical axis and image display devices, and each having an image-projecting end aimed at the synthetic prism, the synthetic prism comprises means for combining beams of light respectively traveling from the image display devices of the respective video projection units to create a combined image; and means for sending the combined image to the projection lens;

wherein a projection region of an image displayed on each of the image display devices corresponds to each section of the dome screen, and the projection regions to be projected onto the respective sections are combined in the video projector to create a projection image continuing throughout the full dome screen.

5. A video projector for a dome screen according to claim 3, wherein the projector lens barrel comprises both the synthetic prism and the projection lens operably disposed in the housing, and further comprising means for adjusting the barrel in height and inclination with respect to the housing.

* * * * *